(12) United States Patent
Davis et al.

(10) Patent No.: US 7,866,135 B2
(45) Date of Patent: Jan. 11, 2011

(54) FLOW CONTROL BAFFLE FOR TURF MOWER

(75) Inventors: Benjamin P. Davis, Brookfield, WI (US); Gary L. Nicholson, Beatrice, NE (US); Judd W. Stewart, Fairbury, NE (US)

(73) Assignee: Exmark Manufacturing Company, Inc., Beatrice, NE (US)

( * ) Notice: Subject to any disclaimer, the term of this patent is extended or adjusted under 35 U.S.C. 154(b) by 0 days.

(21) Appl. No.: 11/511,842

(22) Filed: Aug. 28, 2006

(65) Prior Publication Data

US 2008/0047249 A1    Feb. 28, 2008

(51) Int. Cl.
    *A01D 67/00*    (2006.01)
(52) U.S. Cl. ...................................... 56/320.2
(58) Field of Classification Search ................. 56/320.2
    See application file for complete search history.

(56) References Cited

U.S. PATENT DOCUMENTS

| | | |
|---|---|---|
| 2,756,556 A | 7/1956 | Watkins |
| 3,049,853 A | 11/1958 | Horner et al. |
| 3,400,523 A | 9/1968 | Klingofstrom et al. |
| 3,503,194 A | 3/1970 | Rituals |
| 3,568,421 A | 3/1971 | Smith et al. |
| 3,646,739 A | 3/1972 | Dahl |
| 3,648,445 A | 3/1972 | Efflandt |
| 3,760,572 A | 9/1973 | Marion et al. |
| 3,805,499 A | 4/1974 | Woelffer |
| 4,008,559 A | 2/1977 | Lessig, III et al. |
| 4,142,351 A | 3/1979 | Neice et al. |
| 4,257,214 A * | 3/1981 | Ferguson et al. .............. 56/13.4 |
| 4,258,539 A | 3/1981 | Pearce et al. |
| 4,322,938 A | 4/1982 | Efflandt |
| 4,502,271 A | 3/1985 | Hansen et al. |
| 4,672,799 A | 6/1987 | Parish |
| 5,101,617 A | 4/1992 | Hare et al. |
| 5,191,756 A * | 3/1993 | Kuhn .......................... 56/17.5 |
| 5,195,311 A | 3/1993 | Holland |
| 5,205,112 A * | 4/1993 | Tillotson et al. .................. 56/2 |
| 5,331,794 A | 7/1994 | Reichle |
| 5,457,947 A * | 10/1995 | Samejima et al. ............ 56/16.7 |
| 5,491,964 A | 2/1996 | Butler |

(Continued)

OTHER PUBLICATIONS

Letter from The University of Georgia Research Foundation, Inc. and attachment: "UGARF Case 950 New Design and Material for Mower Discharge Guard/Outlet Chute," dated Jun. 13, 2001.

*Primary Examiner*—Alicia M Torres
(74) *Attorney, Agent, or Firm*—Briggs and Morgan, P.A.

(57) ABSTRACT

A flow control baffle for a turf mower having a plurality of mower blades carried within a mower deck. The flow control baffle includes a foot wall section which extends from near a side discharge opening into the cutting chamber. The foot wall may be curved and may be movable to define a volute section of variable width. In one embodiment, the flow control baffle includes a panel wall and a foot wall, which are connected together and movable relative to other portions of the mower deck. In one embodiment, the flow control baffle is movable and selectively positioned within the cutting deck in order to optimize mower performance in view of location operating conditions. In one embodiment, the air flow control baffle defines sacrificial wear surfaces within the mower deck at locations of otherwise high wear.

25 Claims, 6 Drawing Sheets

U.S. PATENT DOCUMENTS

| | | |
|---|---|---|
| 5,992,135 A | 11/1999 | Benway |
| 6,154,064 A | 11/2000 | Proebsting |
| 6,184,722 B1 | 2/2001 | Hayakawa |
| 6,192,666 B1 * | 2/2001 | Sugden et al. ............. 56/320.2 |
| 6,843,048 B2 * | 1/2005 | Osborne .................... 56/320.2 |
| 6,874,309 B1 * | 4/2005 | Bellis, Jr. ................... 56/320.2 |
| 7,069,712 B2 * | 7/2006 | Bauer et al. ................ 56/320.2 |
| 7,093,415 B2 * | 8/2006 | Kallevig et al. ............. 56/320.2 |
| 7,360,352 B2 * | 4/2008 | Samejima et al. .......... 56/320.2 |

* cited by examiner

# FLOW CONTROL BAFFLE FOR TURF MOWER

TECHNICAL FIELD

The invention relates to a turf mower and more particularly to a turf mower having a flow control baffle positioned at the underside of a mower deck.

BACKGROUND OF THE INVENTION

Commercial-type lawn mowers may include a mower deck having multiple rotary cutting blades positioned therein. Common classifications of mower decks include a mulching deck, a side discharge deck, a rear discharge deck or a bagging deck depending upon the manner in which the cut grass cuttings or clippings are handled or directed. When a mower is of the side discharge deck type, the grass clippings are discharged out a side opening of the deck. The prior art has previously provided flow control and mulch baffles which are attached to the underside of the mower deck.

BRIEF SUMMARY OF THE INVENTION

A flow control baffle within a mower deck effectively controls airflow and grass dispersal out of a side discharge chute of a turf mower. In one embodiment, the flow control baffle is movable and includes both panel and foot walls which slide relative to an upper wall of the mower deck. The foot wall may form a portion of a volute section having a variable width dependent on the baffle position within the mower deck. The position of the movable flow control baffle can be adjusted to maximize turf mower performance. For example, the flow control baffle can be operator adjusted to minimize the width of the volute section so as to increase air velocity through the side discharge chute. Such a baffle position may result in better grass dispersal under certain conditions. Alternatively, the flow control baffle can be adjusted to maximize the width of the volute section and substantially not block the side discharge opening to promote efficient removal of debris under heavy load conditions. In one embodiment, the range of flow control baffle movement is limited by the length of a slot provided in an upper wall of the mower deck. In another embodiment, the flow control baffle can be fixed in position within the mower deck.

In one embodiment of the present invention, a selectively adjustable flow control baffle is provided rearwardly of the cutting blade chambers and proximate to the side discharge chute of the mower deck. The selectively adjustable flow control baffle may be manipulated by an operator between at least a pair of operational positions. In one embodiment of the present invention, the selectively adjustable flow control baffle may be placed in a plurality of positions between a pair of end positions. The selectively adjustable flow control baffle is preferably operator-adjustable by a mechanism accessible from a top surface of the mower deck. In a preferred embodiment, walls of a selectively adjustable flow control baffle remain generally vertical as the baffle is moved between positions.

One object of the invention is to provide a multiblade, side discharge mower having flow control baffles including at least one selectively adjustable flow control baffle. Still another object of the invention is to provide a lawn mower of the type described wherein the selectively adjustable flow control baffle which may be accessed by an operator from above the mower deck. These and other objects will be apparent to those skilled in the art.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
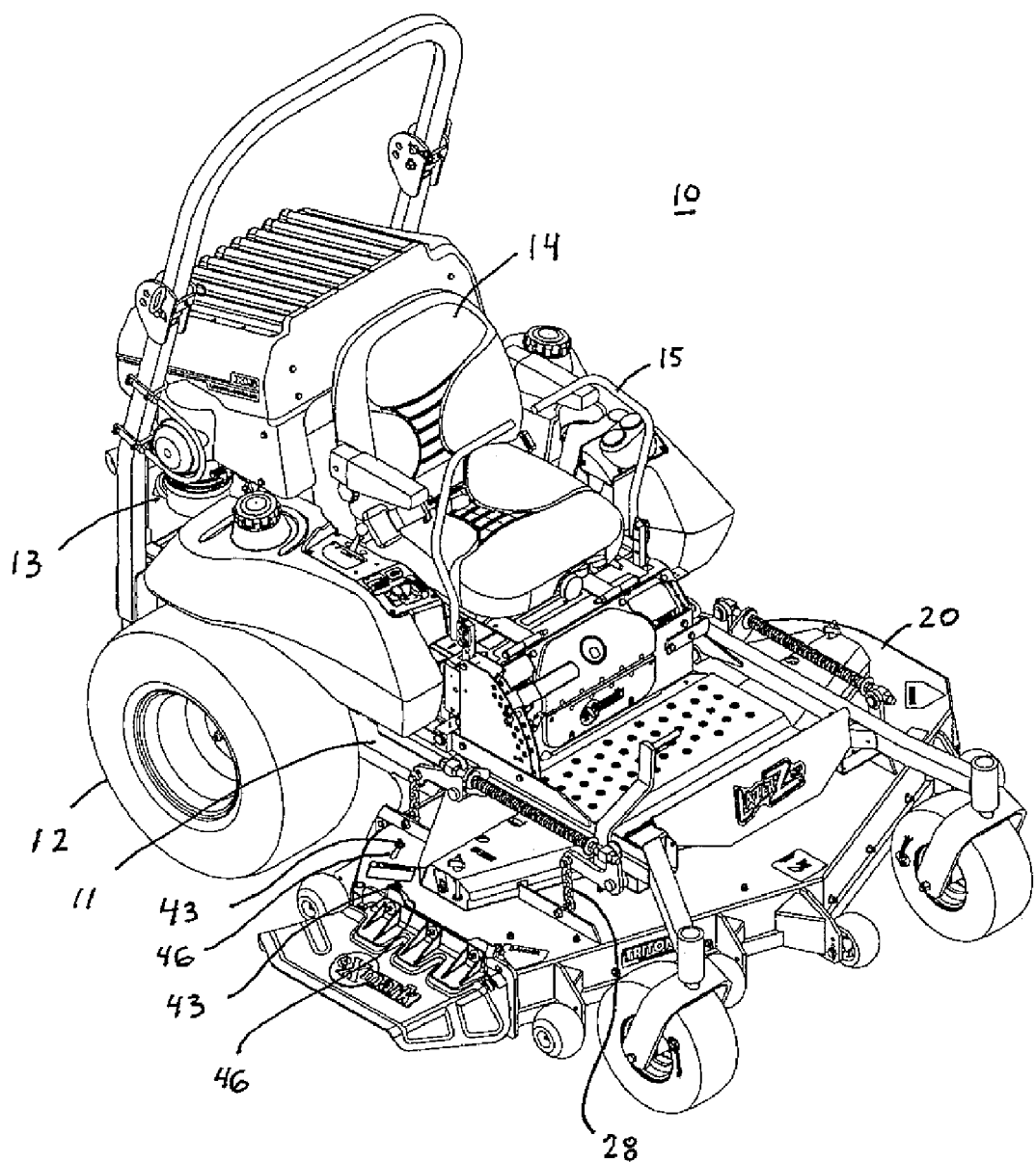
FIG. 1 illustrates a turf mower with a mower deck having a flow control baffle according to the present invention.

FIG. 1 illustrates a ride-on turf mower 10. Although the invention described herein is ideally suited for use with a riding mower, it is believed that the invention described herein also has applicability with respect to other mowers, for example walk-behind mowers. Mower 10 includes frame 11 attached to a pair of drive wheels 12 positioned on opposite sides of frame 11 at the rearward end of mower 10. An internal combustion engine 13 is mounted on frame 11. Engine 13 is operatively connected to a pair of hydraulic pumps (not shown) which are operatively connected to hydraulic motors operatively connected to the drive wheels 12, respectively. Mower 10 includes an operator's station 14 and steering controls 15.

Figure 2:
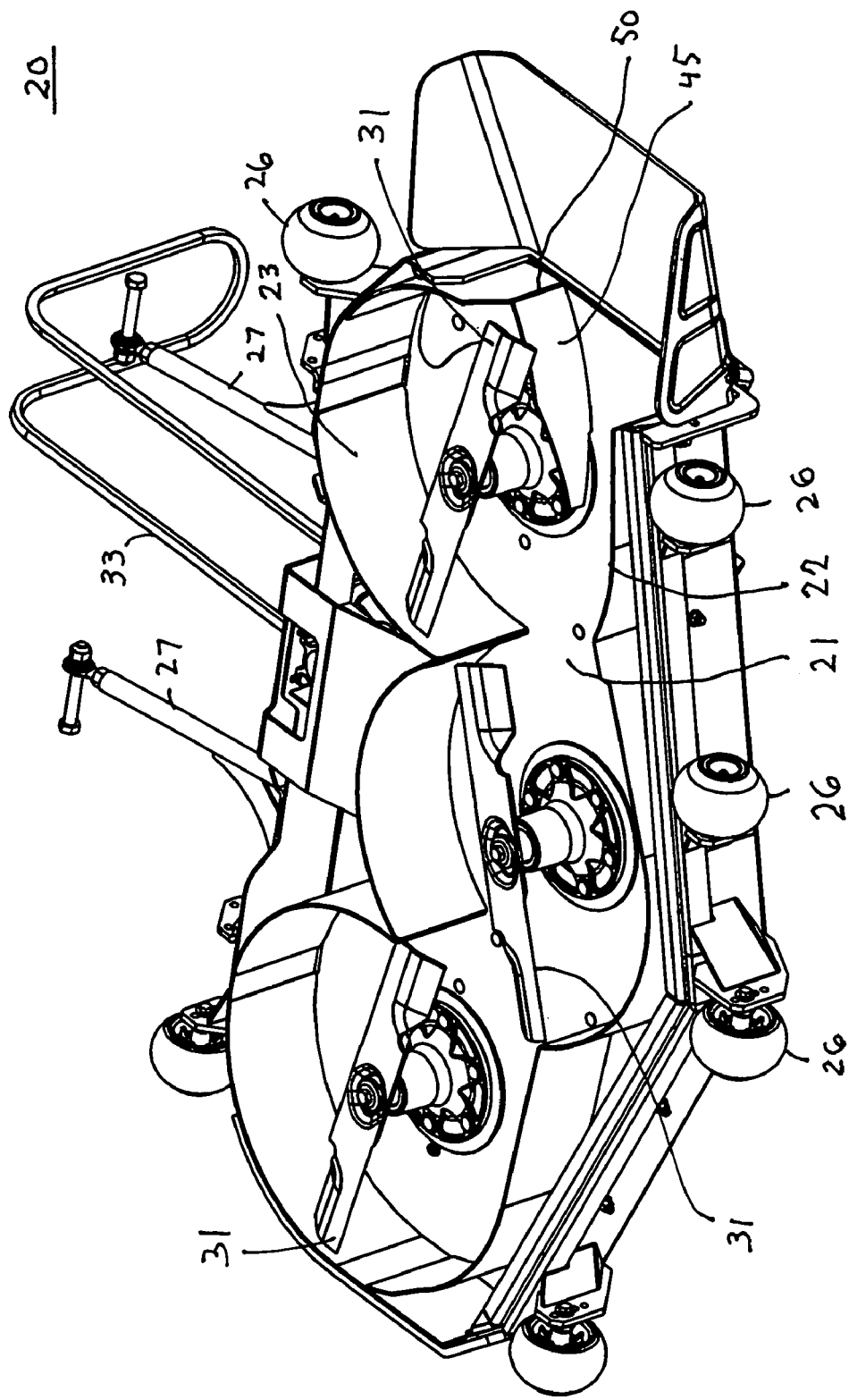
FIG. 2 illustrates a bottom perspective view of the mower deck of FIG. 1.

FIG. 2 illustrates an underside view of mower deck 20 of mower 10. Mower deck 20 includes a top wall 21, front wall 22 and rear wall 23. Side discharge opening 24 is provided between front wall 22 and rear wall 23. Wheel assemblies 26 may provide some support for deck 20 during mowing operations. A pair of control arms 27 connect the rearward end of deck 20 to frame 11. Mower deck 20 can be supported by a plurality of chain members 28 (shown in FIG. 1) which are connected to a mower deck height control mechanism to enable mower deck 20 to be raised or lowered with respect to frame 11.

Mower deck 20 includes a downwardly facing cutting chamber 30. Rotary cutting blades 31 are carried inside cutting chamber 30 and rotate in a generally horizontal cutting plane about a generally vertical rotational axis. Each rotary cutting blade 31 has sharpened cutting edges which cut the grass as blade rotates in its cutting plane. Front wall 22 and rear wall 23 of mower deck 20 are generally configured semi-circular portions each associated with one of the cutting blades 31.

A means for rotating cutting blades 31 within cutting chamber 30 is provided on mower deck 20. In this embodiment, the means for blade rotation includes a belt and pulley system, including belt 33. Alternatively, an individual electric or hydraulic motor may be utilized to power the cutting blades.

Figure 4:
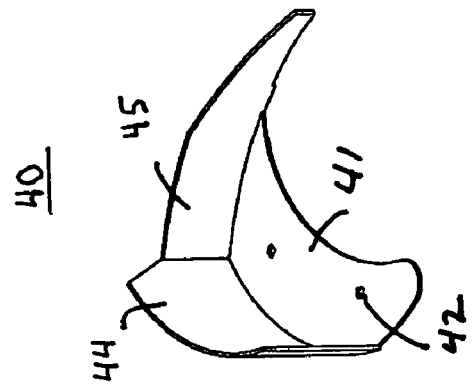
FIGS. 3 and 4 are perspective illustrates of an embodiment of a movable flow control baffle in accordance with the present invention.
Figure 3:
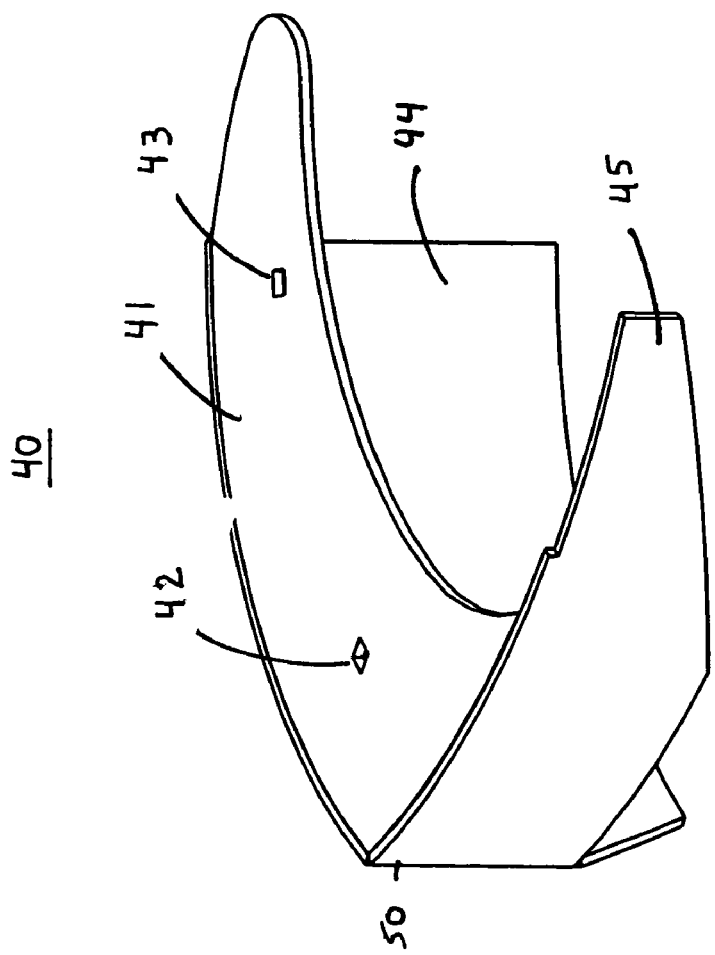
Figure 5:
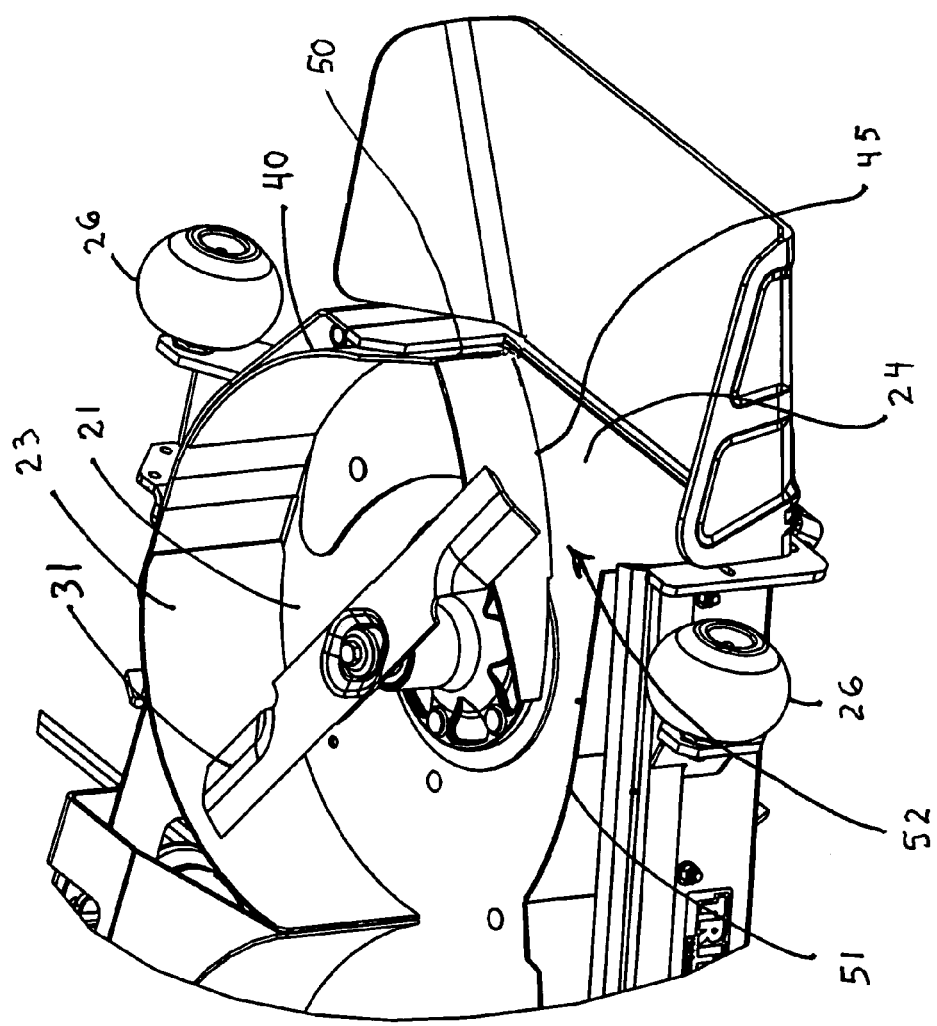
FIG. 5 is a perspective view of a portion of the mower deck of FIG. 1 showing the flow control baffle in a first position.
Figure 6:
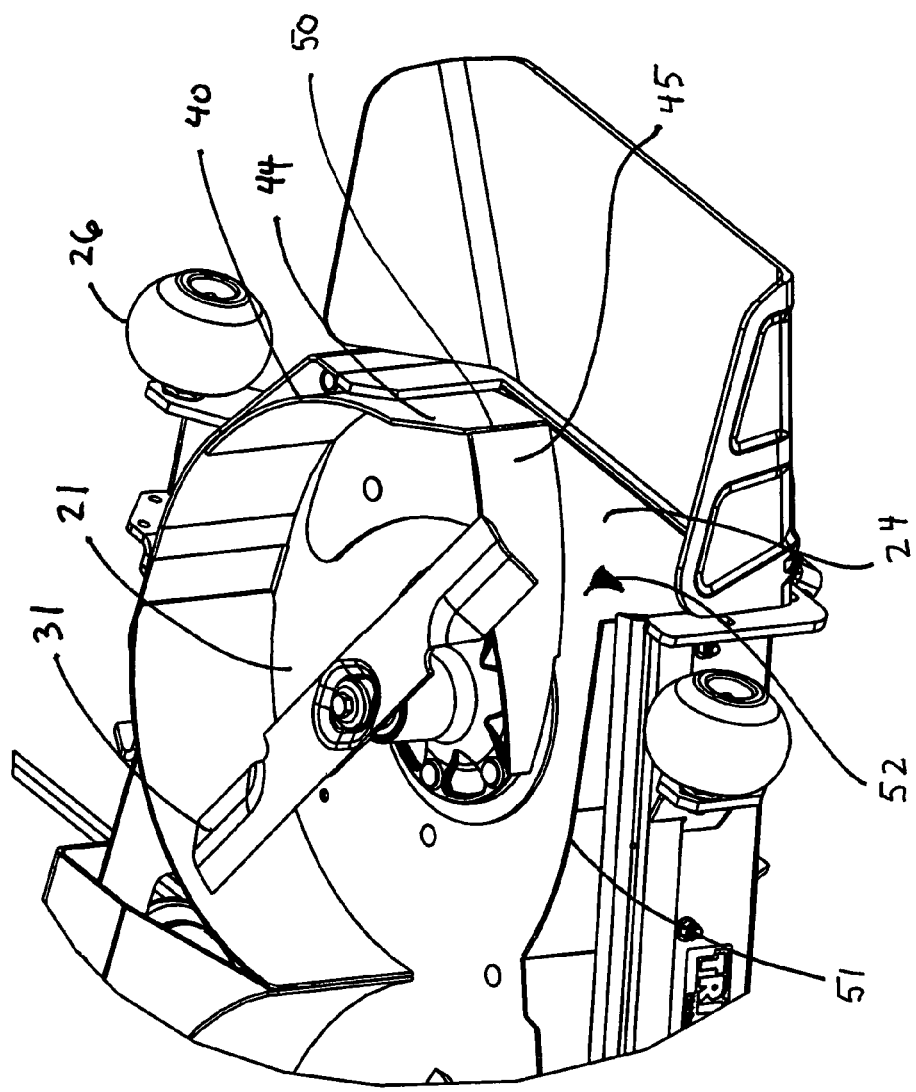
FIG. 6 is a perspective view of a portion of the mower deck of FIG. 1 showing the flow control baffle in a second position.

FIG. 2 shows sliding flow control baffle 40 positioned proximate to side discharge opening 24. FIGS. 3 and 4 illustrate sliding flow control baffle 40 as removed from mower deck 20. Baffle 40 includes a generally planar top wall 41 having a pair of apertures 42 through which baffle fasteners 43 (shown in FIG. 1) are received. Baffle 40 further includes panel wall 44 and foot wall 45. FIGS. 5 and 6 illustrate baffle 40 as installed in mower deck 20 and depict, for this embodiment, the extent of baffle movement within deck 20. Baffle 40 is connected through fasteners 43 to mower deck 20. When fasteners 43 are loosened, baffle 40 may slide within deck 20 with top wall 41 in sliding contact with top wall 21 of mower deck 20. The range of positions of baffle 40 is defined, in this embodiment, by the length of slots 46 (shown in FIG. 1).

Panel wall 44 is generally semicircular with a radius approximating the radius of other semicircular portions of front wall 22 and rear wall 23. As shown in FIGS. 5 and 6, panel wall 44 can be moved to block a portion of side discharge opening 24. In this manner, panel wall 44 can effectively decrease the area of side discharge opening 24.

In the illustrated embodiment, foot wall 45 is narrower than panel wall 44 and extends from an edge 50 near side discharge opening 24 inwardly toward an interior of mower deck 20. Foot wall 45 extends within the area bounded by the cutting blade plane and top wall 21 of mower deck 20. In other words, foot wall 45 is located between the cutting blade plane and top wall 21. Foot wall 45 and a portion 51 of front wall 22 define walls of a volute section 52. In operation, foot wall 45 controls air flow within mower deck 20 to minimize circulation of grass clippings within deck 20 and guides material out of the cutting chamber and through side discharge opening 24.

Figure 7:
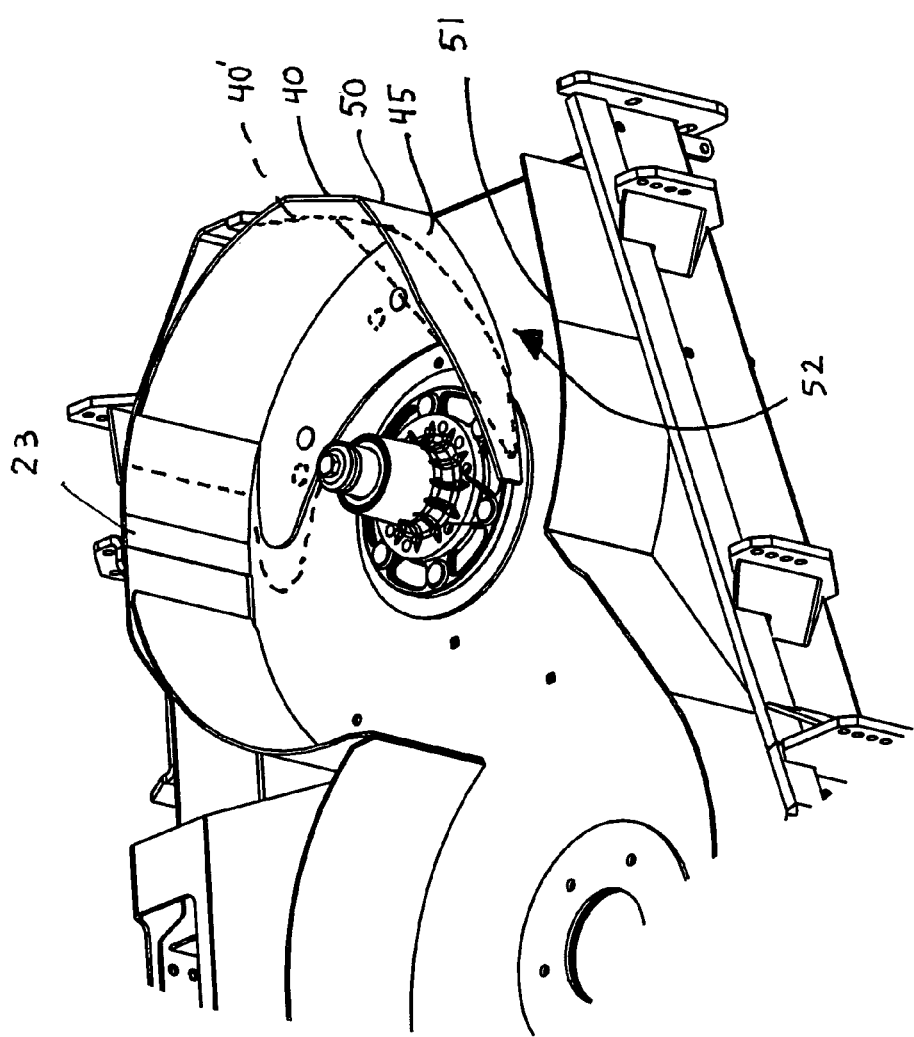
FIG. 7 is a perspective view of a portion of the mower deck of FIG. 1 showing the flow control baffle in the first position and second position.

The relative position of flow control baffle 40 within mower deck 20 can be control by an operator to optimize mower performance. An operator may selectively position flow control baffle 40 within mower deck 20 by first loosening fasteners 43. Once fasteners 43 are loosened, flow control baffle 40 may be biased into a different position by applying a force to the baffle 40. The range of motion of flow control baffle 40 is limited, in the illustrated embodiment, by the length of slots 46. FIG. 5 illustrates flow control baffle 40 in a first position. Such a position may be desirable during mowing operations under wet conditions, tall and/or dense grass conditions, or while in a maximum ground speed condition. In comparison, FIG. 6 illustrates flow control baffle 40 in a second position. Such a position may be useful when operating the mower in short and light grass conditions, dry conditions, or where maximum dispersion of clippings is desired. Fasteners 43 are tightened to secure flow control baffle 40 at a desired position. FIG. 7 illustrates flow control baffle in the position of FIG. 6 with phantom lines showing flow control baffle 40' as positioned in FIG. 5. Flow control baffle 40 may be positioned at any location between the range of positions illustrated in FIG. 7, i.e., baffle 40 is provided with "infinite adjustment" between a range of positions.

Mower deck 20 of the present invention provides a volute section 52 proximate to side discharge opening 24 which has a selectively adjustable width. Air flow through volute section 52 is dependent on volute width as defined by position of baffle 40 and, as a result, a mower deck of the present invention provides a means for controlling the volute width and air flow through side discharge opening 24 in order to optimize operating characteristics of the mower depending on local turf conditions.

In certain operating conditions, e.g., sandy soil, the areas occupied by panel wall 44 and foot wall 45 are subject to significant wear and are replaceable to during routine maintenance of the machine. In this regard, the replaceable baffle 40 provides sacrificial surfaces at high wear locations within the cutting chamber.

While baffle 40 has been shown in the illustrated embodiments to be a movable structure, it is envisioned that the benefits of the present invention may be applicable to mower decks having non-movable baffle structures. For example, the provision of non-movable foot wall 45 within a mower deck may yield benefits provided by the illustrated embodiments. In another embodiment, a baffle having a panel wall 44 and a foot wall 45 may be secured in place and otherwise non-movable during machine operation. Such an embodiment may be secured via welds, threaded fasteners, etc. As a result, the benefits of flow control within a cutting chamber and the provision of sacrificial wear surfaces within a mower deck could be provided by a baffle of the present invention adapted to be non-movable, but possibly replaceable.

While panel wall 44 and foot wall 45 have been shown as a single continuous and curved walls, alternative embodiments of panel wall 44 and foot wall 45 may include, but are not limited to, multiple separate walls, non-curved wall portions, complex curved walls, walls with apertures, walls with angled deflectors, non-tapering walls, walls with multiple different materials and cantilevered wall sections. As a result, although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A turf mower comprising:
a mower deck carrying a plurality of cutting blades and having a top wall and a plurality of walls defining a cutting chamber and a side discharge opening nearest one of said plurality of cutting blades, said top wall having a pair of apertures therethrough;

a sliding flow control baffle having a panel wall adapted to block part of the side discharge opening and a curved foot wall, with said curved foot wall extending generally vertically and inwardly into the mower deck between said top wall of the mower deck and a plane of rotation of said plurality of cutting blades, wherein a height of said foot wall decreases as said foot wall extends inwardly; and a pair of fasteners passing through the pair of apertures and connecting the flow control baffle to an underside of the cutting chamber, together said pair of fasteners and said pair of apertures limiting a range of motion of the flow control baffle within the cutting chamber, and limiting said sliding flow control baffle to rotate generally about a center of said nearest one of said plurality of cutting blades, wherein the curved foot wall and a portion of said plurality of walls define a volute section, with said volute section having a variable width dependent on a position of said foot wall relative to said center, and with airflow through said side discharge opening being controlled by said volute width.

2. The turf mower of claim 1 wherein a curved portion of said plurality of walls is stationary and nearer to a front edge of the mower deck than the curved foot wall.

3. The turf mower of claim 1 wherein said panel wall and said foot wall remain generally vertical as said flow control baffle slides between positions.

4. The turf mower of claim 1 wherein said flow control baffle includes a top wall having a pair of apertures sized to receive said pair of fasteners.

5. A turf mower comprising:
a mower deck having a top wall and a plurality of walls together defining a cutting chamber, said mower deck having a side discharge opening through which grass is thrown during mower operation; and a flow control baffle coupled through a sliding connection to said top wall, said baffle including a panel wall which blocks grass dispersal through a portion of said side discharge chute and a generally vertical curved foot wall, said foot wall extending inwardly into the mower deck between the top wall of the mower deck and a plane of rotation of a cutting blade, wherein said foot wall is curved, and said foot wall and a portion of said plurality of walls define a volute section of variable width dependent on said baffle position, and said sliding connection including a aperture in the top wall of the mower deck and a fastener connecting the flow control baffle to the mower deck, said sliding connection limiting said flow control baffle to rotate generally about a center axis of said cutting blade, wherein the foot wall and a curved portion of said mower deck define a volute section of variable width dependent on a position of said foot wall relative to said center axis, and with airflow through said side discharge opening being controlled by said volute width.

6. The turf mower of claim 5 wherein a height of said foot wall decreases as said foot wall extends inwardly.

7. The turf mower of claim 5 wherein said panel wall and said foot wall remain generally vertical as said flow control baffle slides between positions.

8. A turf mower comprising:
a mower deck having a top wall and a plurality of rotating cutting blades;
a flow control baffle being movable between at least two positions within the mower deck, said flow control baffle having a panel wall defining at least one edge of a side discharge opening, wherein said side discharge opening is increasingly blocked by said panel wall as said baffle moves between said at least two positions, and said flow control baffle includes a generally vertical curved foot wall extending inwardly into the mower deck between the top wall and a plane of rotation of said plurality of rotating cutting blades, wherein the foot wall and a curved portion of said mower deck define a volute section of variable width dependent on a position of said foot wall, and with airflow through said side discharge opening being controlled by volute width, and wherein a height of said foot wall decreases as said foot wall extends into the mower deck; and a plurality of connectors to connect the flow control baffle to said mower deck, with said plurality of connectors including a fastener passing through a aperture of the mower deck and a aperture of the flow control baffle, and said plurality of connectors limit the flow control baffle to rotate generally about a center of one of said plurality of rotating cutting blades.

9. The turf mower of claim 8 wherein said panel wall extends beneath the plane of rotation of said plurality of cutting blades.

10. The turf mower of claim 9 wherein said panel wall and foot wall remain generally vertical as said flow control baffle rotates about said cutting blade center.

11. A turf mower comprising:
a mower deck carrying a plurality of cutting blades and having a top wall and a plurality of generally vertical walls together defining a cutting chamber;
a movable baffle having a curved foot wall extended generally from a side discharge opening into said cutting chamber, said foot wall together with at least one of said plurality of generally vertical walls defining a volute section of variable width dependent on a position of said movable baffle within said cutting chamber, wherein said at least one of said plurality of generally vertical walls is stationary relative to said movable baffle, and airflow through said side discharge opening is substantially dependent on a position of said movable baffle within said cutting chamber; and means for connecting the baffle to an underside of the mower deck, said means including a first fastener connected to the baffle and passing through a first slot opening of the top wall of the mower deck and a second fastener connected to the baffle and passing through a second slot opening of the top wall, said means for connecting allowing the baffle to be selectively positioned within the cutting chamber, and said first and second slot openings limiting the baffle to rotate generally about a center of one of said plurality of cutting blades nearest to the side discharge opening.

12. The turf mower of claim 11 wherein said foot wall is generally vertical.

13. The turf mower of claim 11 wherein said foot wall extends into said cutting chamber between a mower blade and said top wall.

14. The turf mower of claim 11 wherein a height of said foot wall decreases as said wall extends into said cutting chamber.

15. The turf mower of claim 11 wherein said baffle includes a panel which blocks a portion of said side discharge opening dependent on said movable baffle position.

16. A turf mower comprising:
a mower deck carrying a plurality of cutting blades and having a top wall and a plurality of generally vertical walls together defining a cutting chamber;

a baffle having a curved foot wall extended generally from a side discharge opening into said cutting chamber, said foot wall extending between a plane of rotation of one of said plurality of cutting blades and the top wall of the cutting chamber, and said foot wall together with at least one of said plurality of generally vertical walls defining a volute section with a width dependent on a position of said baffle within said cutting chamber, wherein airflow through said side discharge opening is substantially dependent on a position of said baffle; and a plurality of fasteners to connect the baffle to an underside of the mower deck, said plurality of fasteners cooperating with a plurality of apertures in the mower deck or the baffle or both to limit the baffle to rotation about a center axis of said one cutting blade.

17. The turf mower of claim 16 wherein said foot wall extends into said cutting chamber between a mower blade and said top wall.

18. A turf mower comprising:

a mower deck having a plurality of walls defining a cutting chamber containing a plurality of cutting blades and a side discharge opening nearest one of said plurality of cutting blades;

a flow control baffle having a panel wall and a curved foot wall extending inwardly between an upper wall of the mower deck and a cutting blade plane of rotation, with a height of said foot wall decreasing as said foot wall extends inwardly; and a plurality of fasteners to connect the flow control baffle to an underside of the mower deck, with said plurality of fasteners cooperating with a plurality of apertures in the mower deck to limit positions of the flow control baffle within the mower deck, wherein said positions are related by rotation about a center axis of said nearest one of said plurality of cutting blades, and wherein the foot wall and a curved portion of the mower deck define a volute section of variable width dependent on a position of said foot wall, and with airflow through said side discharge opening being controlled by said volute width.

19. The turf mower of claim 18 wherein said flow control baffle is movably connected to said upper wall of said mower deck and is capable of being repositioned in order to optimize mower performance.

20. The turf mower of claim 19 wherein a portion of said flow control baffle is adapted to block part of the side discharge opening of said mower deck.

21. The turf mower of claim 20 wherein said portion is a portion of said panel wall.

22. The turf mower of claim 18 wherein said panel wall and said foot wall are generally vertically oriented during mower operation.

23. The turf mower of claim 18 wherein said foot wall extends from near said upper wall to a location above said cutting plane of rotation.

24. A method of turf mowing using a mower comprising:

providing a mower deck having a plurality of walls defining a cutting chamber containing a plurality of cutting blades and a side discharge opening nearest one of said plurality of cutting blades, a flow control baffle having a curved foot wall extending inwardly between an upper wall of the mower deck and a cutting blade plane of rotation, with a height of said foot wall decreasing as said foot wall extends inwardly, and a plurality of fasteners to connect the flow control baffle to an underside of the mower deck, with said plurality of fasteners cooperating with a plurality of apertures in the mower deck to define a range of positions of the flow control baffle within the mower deck, wherein positions in said range of positions are related by rotation of the flow control baffle about a center axis of said nearest one of said plurality of cutting blades, and wherein the foot wall and a curved portion of the plurality of walls define a volute section of variable width dependent on a position of said foot wall, and with airflow through said side discharge opening being controlled by said volute width;

accessing the plurality of fasteners and positioning the flow control baffle in a first position defining a volute section having a first width;

mowing turf with said flow control baffle in a first position;

accessing the plurality of fasteners and positioning the flow control baffle in a second position defining a volute section having a second width, with said second position being defined by rotation of the flow control baffle generally about said center axis; and mowing turf with said flow control baffle in a second position.

25. The method of claim 24 wherein said accessing includes accessing the plurality of fasteners from above the mower deck, and said positioning includes sliding the flow control baffle about said center axis.

* * * * *